United States Patent [19]

Hoffman et al.

[11] Patent Number: 4,798,877

[45] Date of Patent: Jan. 17, 1989

[54] RADIATION-CURABLE RESINS

[75] Inventors: Dwight K. Hoffman; Robert F. Harris, both of Midland, Mich.; Richard A. Hickner, Lake Jackson, Tex.

[73] Assignee: The Dow Chemical Company, Midland, Mich.

[21] Appl. No.: 720,769

[22] Filed: Apr. 8, 1985

[51] Int. Cl.[4] ............................................ C08F 283/10
[52] U.S. Cl. .................................... 525/531; 522/6; 525/530
[58] Field of Search ................ 525/531, 530; 528/393

[56] References Cited

U.S. PATENT DOCUMENTS

| 3,882,003 | 5/1975 | Mani ..................................... 525/531 |
| 4,486,280 | 12/1984 | Hosoi .................................... 525/531 |
| 4,540,752 | 9/1985 | McFadden .......................... 525/531 |

OTHER PUBLICATIONS

European Pat. 0010766 published 5-80.

Primary Examiner—Christopher Henderson

[57] ABSTRACT

Novel radiation-curable, water-compatible, resinous compositions result from (1) terminally unsaturated molecules which are the esters of an epoxy compound and (2) the reaction product of a glycidyl ether and an unsaturated acid having at least one glycidyl group per molecule converted to an onium salt of a quaternary ammonium or amine salt, with the anion of an inorganic or organic acid.

13 Claims, No Drawings

RADIATION-CURABLE RESINS

BACKGROUND OF THE INVENTION

1. Field of the Invention

This invention pertains to novel water-compatible, vinyl ester resins curable with actinic or ionizing radiation inducement and their use in coating substrates. More particularly, this invention pertains to the process for preparing such compositions derived from epoxy resins.

2. Prior Art

It is well-known that many vinyl ester resins are polymerizable by radiation inducement. This is illustrated by the disclosure in U.S. Pat. Nos. 3,560,237 (RE 27,656); 3,661,576; 3,673,14 and British patent No. 1,375,177. The disclosures of U.S. Pat. Nos. 3,560,237 (RE 27,656) and 3,661,576 are particularly relevant to the instant invention in that they pertain to vinyl ester resins derived from resinous epoxides (i.e., epoxy resins). Many of these vinyl ester resins from resinous epoxides are commercially available and possess excellent physical and chemical properties and are particularly useful as protective coatings for a variety of substrates. In this utility, the vinyl ester resins were normally dissolved in an organic solvent or a reactive diluent, applied by any one of several conventional techniques (e.g., spraying, dipping, etc.) to a substrate and then cured with actinic radiation.

The necessity of using an organic solvent is a commercial impediment for using the photocurable compositions set forth above. Organic solvents must be recovered and recycled or disposed of for safety, environmental and/or economic reasons. The recovery in many instances is difficult and/or costly. These problems can be reduced if the organic solvent reacts into the coating. Considerable research has been directed toward the use of vinyl monomers and low viscosity vinyl resins as reactive diluenss. However, many of the useful reactive diluents, e.g., 2-hydroxyethyl acrylate, are toxic and represent considerable health and environmental problems.

Presently available radiation-curable systems use a reactive diluent such as an acrylic monomer to reduce the viscosity to the level required for application. Many of these diluents suffer from excessive toxicity, volatility or odor. In addition, since the diluent is incorporated into the final product, the amount and kind of diluent will affect the properties of the end coating.

With conventional solvent systems, additional solvent can be added to adjust viscosity without materially affecting the properties of the final coating. However, the presence of these solvents poses a toxicity and environmental problem. The commercial problems enumerated above have caused many potential customers to use alternate systems having different mechanisms of cure and/or different polymer structure, e.g., latexes.

Many resinous systems have been rendered water-soluble or water-dispersible (oil-in-water dispersions) by attaching various onium (e.g., sulfonium, phosphonium, ammonium, etc.) groups to the backbone of the resin or by adding an onium surfactant to the resin as a dispersing vehicle. Many of these onium compounds are electroreducible, particularly the sulfonium and isothiuronium compounds, and have been used in cathodic electrodeposition processes. An exhaustive documentation of this is not required; however, reference is made to U.S. Pat. Nos. 3,793,278; 3,936,405; 3,937,679; 3,959,106 and 3,894,922 which represent a series of cases in which certain onium-modified epoxy resins were alleged to be useful as electrodepositable compositions. The onium-modified epoxy resins were prepared by reacting an epoxy resin with a tertiary phosphine, tertiary amine or sulfide in the presence of an acid. The acid used in this series of experiments had dissociation constants greater than $1\times 10^{-5}$ and included both organic and inorganic acids. Alkenoic acids, while meeting the dissociation constant criterion in many instances, were not named or used in any of these particular references.

Harris et al. (U.S. Pat. No. 4,020,030) found that acids having a dissociation constant greater than $1\times 10^{-5}$ were suitable in their preparation of sulfonium-modified epoxy resins and they explicitly state that alkenoic acids (e.g., acrylic acid, methacrylic acid, etc.) are satisfactory in their process. However, these acids were converted to sulfonium alkenoates; vinyl ester resins were not considered. Harris et al. do not indicate that any of their compounds are (or would be) photocurable.

SUMMARY OF THE INVENTION

The present invention is a water-compatible, radiation-curable, resinous composition comprising (1) molecules comprising vinylized epoxy resin functionalities and (2) molecules containing groups of the reaction product of an epoxy compound, a secondary or tertiary amine and an acid.

In another aspect, the present invention is a water-compatible, radiation-curable, resinous composition comprising (1) molecules containing ester groups resulting from the esterification of an epoxy compound and an unsaturated carboxylic acid having a dissociation constant of at least $1\times 10^{-7}$ and (2) molecules containing groups of the reaction product of an epoxy compound, a secondary or tertiary amine and an acid and having the structure:

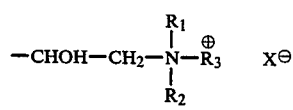

wherein $R_1$ and $R_2$ are independently hydrocarbon or inertly substituted hydrocarbon having 1 to 12 carbon atoms; $R_3$ is hydrogen or hydrocarbon or inertly substituted hydrocarbon and X is the anion of an inorganic or organic acid.

The present invention is also ammonium and quaternary ammonium salt-stabilized, water-compatible, ionizing radiation and light curable vinylized epoxy resin(s) and aqueous solutions or dispersions containing the same. The novel compositions can be transparent or clear liquids into which water can be solubilized (i.e., they can be thinned to lower viscosities by dilution with water) and they are compatible with many unmodified vinyl ester resins. The compositions can also be water-in-oil or oil-in-water dispersions. The compositions can then be coated onto substrates and cured by actinic light, electron beam or free-radical initiation.

DETAILED DESCRIPTION OF THE INVENTION

The compositions are conveniently prepared by reacting an epoxy compound with a secondary or tertiary amine and a polymerizable alkenoic acid or by reacting a monoepoxide with such an amine and a polymerizable alkenoic acid and blending the reaction product with a vinyl ester resin.

Epoxy compounds constitute a known class of compounds, each member of which bears at least one pendant or terminal 1,2-epoxy group (i.e., vicinal epoxy groups). Suitable such epoxy groups are described, for example, in U.S. Pat. Nos. 3,477,990 and 3,793,278; Canadian Patent No. 893,191; German Patent Application No. 2,206,218 and the text *Handbook of Epoxy Resins,* by H. Lee and K. Neville, McGraw Hill, New York (1967). The preferred classes of epoxy compounds for use herein correspond to Formulas I, II and III below.

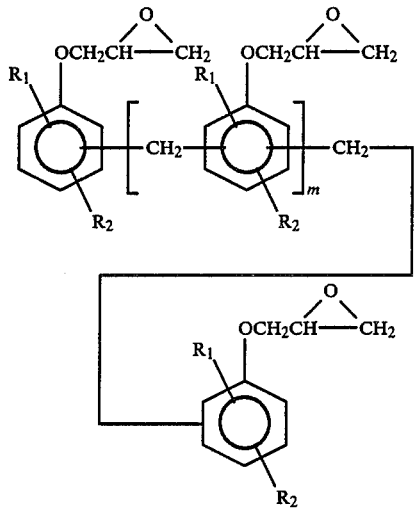

I wherein $R_1$ and $R_2$ are hydrogen, lower alkyl of 1 to 6 carbon atoms, chlorine or bromine, and m has an average numerical value up to 3 including 0.

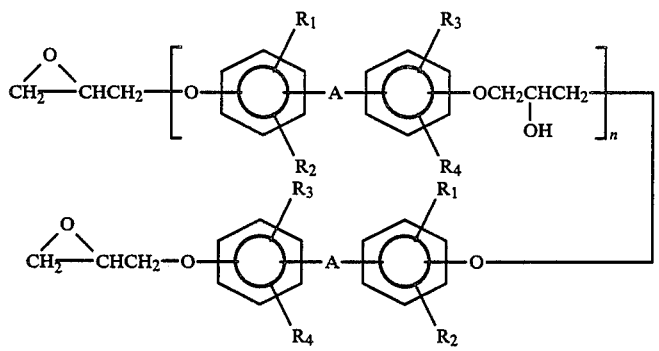

II wherein $R_1$, $R_2$, $R_3$ and $R_4$ are each independently hydrogen, lower alkyl of 1 to 6 carbon atoms, chlorine or bromine and —A— is —S—, —O—, —S—S—,

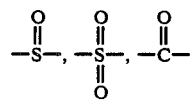

or a divalent saturated hydrocarbon of from 1 to 6 carbon atoms (e.g., methylene, ethylene, isopropylidene, cyclohexylidene, etc.) and n has an average numerical value up to about 20 including 0. Also useful are the hydrogenated equivalents, such as those from hydrogenated bisphenol A.

In Formulas I and II, $R_1$–$R_4$ are each preferably hydrogen and A is preferably isopropylidene.

Other useful epoxy compounds finding use herein are the aliphatic epoxides of Formula III.

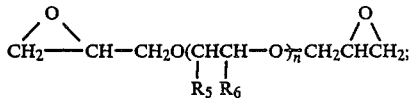

wherein $R_5$ and $R_6$ are each independently hydrogen or lower alkyl. Preferably, $R_5$ or $R_6$ is hydrogen, methyl ethyl, or chloromethyl and n has an average numerical value including 0. N is a value from 2 to about 10.

Other aliphatic and aromatic epoxy compounds, such as the diglycidyl ether of cyclohexanedimethanol, the diglycidyl ether of hydrogenated bisphenol A, the diglycidyl ether of norboranodienedimethanol or the diglycidyl ether of dicyclopentadiene-dimethanol including the higher molecular weight compounds produced by advancing with bisphenol A, can be used.

The monoepoxide reactants are monoglycidyl ethers of a hydrocarbon or inertly substituted hydrocarbon of at least about 6 carbon atoms. Preferably, the ether is an aryl or alkaryl, more preferably phenyl or ($C_1$–$C_{12}$) alkylphenyl. Typical examples are butyl glycidyl ether, phenyl glycidyl ether, t-butylphenyl glycidyl ether, tolyl glycidyl ether, chlorophenyl glycidyl ether, cyclohexyl glycidyl ether, benzyl glycidyl ether, n-octyl glycidyl ether, decyl glycidyl ether, dodecyl glycidyl ether, tetradecyl glycidyl ether, and the like. Monoepoxide compounds can also include α-olefin epoxides as represented by Formula IV:

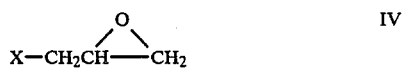

IV in which X is hydrocarbyl or inertly substituted hydrocarbyl as previously defined. Mixtures of monoepoxide compounds with compounds containing a plurality of 1,2-epoxy groups are also operative.

The useful amines are lower molecular weight secondary and tertiary amines of the formula:

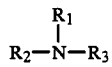

wherein $R_1$ and $R_2$ are independently hydrocarbon or inertly substituted hydrocarbon having 1 to about 12 carbon atoms and $R_3$ is hydrogen or hydrocarbon or inertly substituted hydrocarbon. Typical amines include dimethyl or diethylamine, trimethyl or triethylamine, N-methylethanolamine, N,N-dimethyl ethanolamine, piperidine, morpholine, pyrrolidine and like amines having up to about 12 carbon atoms.

The acids used herein are protic acids having a dissociation constant of at least about $1 \times 10^{-7}$, preferabley $1 \times 10^{-5}$. Such acids are normally organic carboxylic acids and are more preferably monocarboxylic acids. Suitable acids include, for example, acrylic acid, methacrylic acid, maleic acid, itaconic acid, the half-ester of cyclic anhydrides with hydroxy alkyl unsaturated acids, e.g. those formed by reacting 2-hydroxyethyl acrylate with phthalic anhydride, maleic anhydride, succinic anhydride and the like. Acrylic acid and a hydroxyalkyl acrylate half ester of a dicarboxylic anhydride are the most preferred monocarboxylic acids. Mixtures of such acids can be used.

Mixtures of saturated acids and the acids bearing polymerizable vinyl groups can also be used. Mixtures of this type represent a means of limiting the vinyl functionality of the product, etc. Saturated acids can be organic acid, inorganic or mineral acids, as e.g. HCl, $H_3PO_4$, $H_3BO_3$, can also be employed in addition to carboxylic acids.

When the ester of the glycidyl ether and unsaturated acid is a monoester of a monoglycidyl ether, the carboxylic anion of the onium molecule must be unsaturated and preferably is the same anion as that used in making the ester. When the ester is a polyester of a polyglycidyl ether, the carboxylic anion of the onium molecule may be unsaturated, saturated, or a mixture of saturated and unsaturated carboxylic acids.

The process outlined above produces amine salt or quaternary ammonium salt groups by the reaction of the defined amine and acid with the epoxy groups on the epoxy reactant and also produces ester groups by the reaction of the acid with the epoxy groups on the epoxy reactant. In the process, therefore, one utilizes sufficient amounts of amine to present enough amine or quaternary ammonium salt groups in the final product to render the reaction product water-compatible. Normally, satisfactory results are achieved using from about 0.1 to about 0.8 equivalent of amine salt or quaternary ammonium salt per epoxy equivalent weight of the epoxy compound. The acid reactant is normally used in amounts to esterify residual epoxy groups and can be used to provide the salt. The final products contain very few, if any, residual epoxy groups.

The compositions can be prepared by processes that vary depending upon the amine salt or quaternary ammonium salt desired.

In one method to form the water-compatible, curable amine salt, an amine is reacted with an epoxy compound in proportions to form an amine adduct having residual epoxy groups. That adduct is then reacted with a carboxylic acid in an amount equivalent to the epoxy groups in the epoxy compound to form esters with the residual epoxy groups and to provide a carboxylic anion for the amine salt.

In a method to form the quaternary ammonium salt, an epoxy coumpound is reacted with a concentrated inorganic acid, preferably hydrochloric acid, to form a chlorohydrin having residual epoxy groups. The residual epoxy groups are then esterified with a carboxylic acid. The chlorohydrin groups are then quaternized with a tertiary amine with the inorganic acid anion.

The quaternary ammonium salt can also be formed directly by reacting the tertiary amine salt with the epoxy or by reacting the tertiary amine, the epoxy compound and the acid directly.

Water can be included in the process to increase the stability of the onium moieties. However, suitable products can be prepared without adding water and can be then diluted with water to form a dispersion or solution. The amount of water in the compositions can be any amount to provide a desired viscosity for a given application. Additional water can be added to form oil-in-water dispersions when such are desired.

Inhibitors, such as hydroquinone, p-methoxyphenol, phenothiazine and the like are normally added to the reaction mixture to prevent premature gelation of the product during processing by radical polymerization of vinyl double bonds. It is also useful in some instances to post-add such polymerization inhibitors to increase the shelf stability of the final product.

Optional cosolvents may be used to increase processability. Examples include lower alcohols (e.g., methanol, ethanol, etc.), glycol ethers, such as 2-methoxy propanol, 2-ethoxy-ethanol, 2-butoxy ethanol or the like, and reactive diluents (e.g., 2-hydroxyethyl acrylate, 2-hydroxypropyl acrylate, etc.). In general, however, their use is limited.

The compositions are useful coating materials which can be cured (i.e., crosslinked) by actinic light or ionizing radiation. The compositions are dispersions or solutions, and are applied to substrates (such as wood, glass, metal, plastics, etc.) by conventional techniques, as by spray, dip, rollercoat, and other procedures. The coating is subsequently cured by passing the coated article under a source of actinic or ionizing radiation. Normally, this involves passing the coated article under a bank of ultraviolet lights or an electron beam. However, other methods may be used which generate a source of free radicals (e.g., heat, conventional free-radical initiators (peroxides, azobisisobutyronitrile, etc.) and the like.

The novel compositions can also be blended with conventional additives for use in coatings. Typically such additives would include leveling agents, pigments, fillers, initiators, stabilizers, other vinyl materials, etc.

The following experimental data will further illustrate the invention. All parts and percentages are by weight unless otherwise specified.

EXAMPLE 1

A diglycidyl ether of dipropylene glycol (EEW=175-205) sold commercially as D.E.R* 736 epoxy resin (92.5 g, 0.5 eq.) is charged into a 250 ml, 3-necked flask equipped with a stirrer, thermometer, dropping funnel and condenser. The flask is heated to 60° C. and diethylamine (14.6 g, 0.2 eq.) is added over a ten-minute period with stirring. The reaction temperature is maintained at 60° C. for an additional 100 minutes. Then a solution of hydroquinone (0.036 g) and p-methoxyphenol (0.036 g) in acrylic acid (36 g, 0.5 eq.) is added over a ten-minute period. With the reaction temperature at 60° C., the conversion is measured by monitoring acid consumption.

TABLE I

| Time after Addition (min.) | Temperature (°C.) | Conversion (%) |
|---|---|---|
| 60 | 60 | 75 |
| 120 | 75 | 96 |

TABLE I-continued

| Time after Addition (min.) | Temperature (°C.) | Conversion (%) |
|---|---|---|
| 180 | 75 | >99 |

The resulting product is a clear, light yellow viscous fluid. The amount of amine salt content as measured by a conductometric titration is 36 percent of the total acid added. This is a 90 percent yield of amine salt based on the total available amine.

The viscosity of this material can be reduced by adding water as shown in Table II.

*Trademark of The Dow Chemical Company

TABLE II

| Solids (% by Weight) | $H_2O$ (% by Weight) | Viscosity (cs) | Comments |
|---|---|---|---|
| 100 | 0 | 2200 | Clear |
| 91.1 | 8.9 | 884 | Clear |
| 76.1 | 23.4 | 125 | Clear |
| 69.5 | 30.5 | 62 | Clear |
| 62.9 | 37.1 | 32 | Clear |
| 57.2 | 42.8 | 22 | Clear |
| 48.6 | 51.4 | 14 | Phase Separation |

EXAMPLE 2

D.E.R.* 383 epoxy resin, a diglycidyl ether of bisphenol A, (183 g, 1.0 eq.) is charged into a 500-ml, 3-necked flask as described in Example 1. The flask is heated to 45° C. and diethyl amine (29.3 g, 0.4 eq.) is heated over a 10-minute period with stirring. The reaction temperature is increased to 60° C. and held for 80 minutes. Hydroquinone (0.07 g), p-methoxyphenol (0.07 g) and acrylic acid (72 g, 1.0 eq.) are added over a 30-minute period. The reaction temperature is increased to 70° C. and the conversion is measured by monitoring acid consumption.

*Trademark of The Dow Chemical Company

TABLE IV

| Time after Addition (minutes) | Temperature (°C.) | Conversion (% Rx) |
|---|---|---|
| 60 | 70 | 68 |
| 120 | 70 | 78 |
| 185 | 70 | 91 |
| 260 | 70 | 96 |
| 330 | 70 | 98 |
| 380 | 70 | 100 |

The resulting product is a clear, light yellow viscous fluid. The amount of amine salt conent as measured by a conductometric titration is 23 percent of the total acid added. This is a 90 percent yield of amine salt based on the total available amine.

EXAMPLE 3

D.E.R.* 383 epoxy resin (183 g, 1.0 eq.) is charged into a 1-liter, 3-necked flask equipped as described in Example 1 except that a Dean-Stark trap is added between the flask and condenser. The resin is heated to 50° C. and concentrated HCl (39 g, 0.4 eq.) is added over a 10-minute period with mixing. The temperature is raised to 60° C. and held for 20 minutes at which time 100 ml of toluene are added in order to azeotrope off the water. Water and toluene are removed over the next 65 minutes while the temperature of the resin is increased to 150° C. Then the resin is cooled to 80° C. A solution of p-methoxyphenol (0.14 g) and tris(dimethylaminomethyl)phenol (0.5 g) (DMP-30) in acrylic acid (43 g, 0.6 eq.) is added. The temperature is maintained at 80° C. for 260 minutes and at 90° C. for 445 minutes at which time the conversion of acrylic acid as measured by acid consumption is 95 percent. The resin is cooled to 60° C. and trimethylamine (90 g of a 25 percent solution, 0.38 eq.) is added over a 30-minute period. The final product is a clear viscous resin with 79 percent solids. The amount of ionic chloride is 33 percent of the theoretical total Cl as determined by chloride titration. The amount of ionic acrylate is 65 percent of the total acrylic acid as determined by conductometric titration.

The viscosity of this material can be reduced by adding water as shown in Table V.

TABLE V

| Solids (% by Weight) | $H_2O$ (% by Weight) | Viscosity (cs) | Comments |
|---|---|---|---|
| 78.9 | 21.1 | 12,000 | Clear |
| 72.3 | 27.7 | 6,000 | Clear |
| 68.0 | 32.0 | 4,600 | Clear |
| 64.8 | 35.2 | 4,000 | Clear |
| 57.8 | 42.2 | — | phase separation |

EXAMPLE 4

D.E.R.* 736 epoxy resin (185 g, 1 eq.) is charged into a 1-liter flask as described in Example 3. The resin is heated to 50° C. and concentrated HCl (39 g, 0.4 eq.) is added over a 25-minute period with mixing. Then toluene (100 ml) is added in order to azeotrope off the water. Water and toluene are removed over the next 140 minutes while the temperature of the resin is increased to 155° C. Then the resin is cooled to 80° C. Then a solution of p-methoxyphenol (0.14 g) and tris dimethylaminomethyl phenol (0.5 g) (DMP-30) and acrylic acid (43 g) 0.6 eq) are added. The temperature is maintained at 80° C. for 100 minutes and at 90° C. for 275 minutes at which time the conversion of acrylic acid as measured by acid consumption is 72 percent. The resin is cooled to 60° C. and trimethylamine (94 g of a 25 percent solution 0.4 eq.) is added over a 15-minute period. The final product is a clear viscous resin with 79 percent solids. The amount of ionic chloride is 29 percent of the theoretical total Cl as determined by chloride titration. The amount of ionic acrylate is 64 percent of the total acrylic acid as determined by conductometric titration. The resin can be diluted below 73 percent solids with water before phase separation occurs.

EXAMPLE 5

Formulations are applied to cold rolled steel Bonderite ™ 37, 4"×10"24" Ga. Parker Panels using a #16 LDS wire wound coating rod. These are cured using 3×100 watt per linear inch medium pressure Hg arc lamps (Union Carbide PSCU).

(a) The resin of Example 1 (13.74 g) is formulated with a 50/50 weight mixture of benzophenone dissolved in methyl diethanol amine (0.69 g) and diluted with $H_2O$ (3.60 g) to give a low viscosity clear resin which is 80 percent solids in water. This formulation is applied to the panels as indicated above and cured with one pass under the Hg arc lamps with a conveyor belt speed of 100 feet per minute.

(b) The resin of Example 1 (14.77 g) is formulated with benzophenone (0.38 g) and diluted with $H_2O$ (3.78 g) to give a low viscosity clear resin which is 80 percent solids in water. This formulation is applied to the panels as indicated above and cured with one pass under the Hg arc lamps with a conveyor belt speed of 100 feet per minute.

The resin of Example 3 formulated with Vicure #10 (0.22 g) and water (1.03 g) gives a clear resin with reduced viscosity (73.5 percent solids in water). This formulation is applied to the panels and cured with one pass under the Hg arc lamps with a conveyor belt speed of 100 feet per minute.

a trademark of Stauffer Chemical

The above information indicates that the instant class of compounds are water-compatible and easily blended with acrylate systems and useful in forming coating formulations to be cured by actinic light or ionizing radiation.

What is claimed is:

1. A water-compatible, radiation-curable, resinous composition comprising (1) molecules containing ester groups resulting from the esterification of an epoxy compound and an unsaturated carboxylic acid having a dissociation constant of at least $1 \times 10^{-7}$ and (2) molecules containing groups of the reaction product of an epoxy compound, a secondary or tertiary amine and an acid and having the structure:

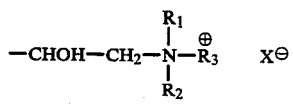

wherein $R_1$ and $R_2$ are independently hydrocarbon or inertly substituted hydrocarbon having 1 to 12 carbon atoms; $R_3$ is hydrogen or hydrocarbon or inertly substituted hydrocarbon and X is the anion of an inorganic or organic acid.

2. The composition of claim 1 wherein said epoxy compound of either component is a glycidyl ether.

3. The composition of claim 1 wherein $R_1$ and $R_2$ are ethyl and X is the anion of the same unsaturated monocarboxylic acid as that of the ester molecule.

4. The composition of claim 1 wherein said epoxy compound of each component is the same.

5. The composition of claim 1 wherein $R_1$, $R_2$ and $R_3$ are the same substituent.

6. The composition of claim 1 wherein $R_1$ and $R_2$ are ethyl and $R_3$ is hydrogen.

7. The composition of claim 1 wherein $R_1$, $R_2$ and $R_3$ are methyl.

8. The composition of claim 1 wherein X is chloride.

9. The composition defined by claim 1 wherein said unsaturated monocarboxylic acid of ester (1) is acrylic or methacrylic acid.

10. The composition of claim 1 wherein said epoxy compound bears, on the average, at least one glycidyl group per resin molecule.

11. The composition of claim 11 wherein said epoxy compound of molecule (1) is the diglycidyl ether of bisphenol A.

12. The composition of claim 9 wherein said epoxy compound of molecule (2) is the diglycidyl ether of bisphenol A.

13. The composition of claim 10 wherein said epoxy compound is the diglycidyl ether of a glycol.

* * * * *